(12) United States Patent
Clifford et al.

(10) Patent No.: US 9,436,734 B2
(45) Date of Patent: *Sep. 6, 2016

(54) RELATIVE PERFORMANCE PREDICTION OF A REPLACEMENT DATABASE MANAGEMENT SYSTEM (DBMS)

(71) Applicant: International Business Machines Corporation, Armonk, NY (US)

(72) Inventors: Austin Clifford, Dublin (IE); Enda McCallig, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 394 days.

This patent is subject to a terminal disclaimer.

(21) Appl. No.: 14/058,261

(22) Filed: Oct. 20, 2013

(65) Prior Publication Data

US 2014/0136516 A1 May 15, 2014

Related U.S. Application Data

(63) Continuation of application No. 13/673,851, filed on Nov. 9, 2012, now Pat. No. 9,110,948.

(51) Int. Cl.
*G06F 17/30* (2006.01)
*G06F 11/34* (2006.01)

(52) U.S. Cl.
CPC ..... *G06F 17/30469* (2013.01); *G06F 11/3419* (2013.01); *G06F 17/30289* (2013.01); *G06F 17/30306* (2013.01); *G06F 11/3414* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,412,806 A | * | 5/1995 | Du | G06F 17/30545 |
| 6,223,171 B1 | * | 4/2001 | Chaudhuri | G06F 11/3447 |
| | | | | 707/718 |
| 8,407,237 B1 | * | 3/2013 | Kudryavtsev | G06F 17/30557 |
| | | | | 707/762 |
| 2014/0006358 A1 | * | 1/2014 | Wang | G06F 17/30289 |
| | | | | 707/687 |

* cited by examiner

*Primary Examiner* — Jay Morrison
(74) *Attorney, Agent, or Firm* — Steven M. Greenberg, Esq.; CRGO LAW

(57) ABSTRACT

Embodiments of the present invention provide a method, system and computer program product for pre-migration performance prediction of a database management system (DBMS). In an embodiment of the invention, a method for pre-migration performance prediction of a DBMS can include executing a calibration workload in a target DBMS to produce a conversion factor of cost of executing the calibration workload to temporal performance of executing the calibration workload. The method also can include subsequently submitting a sample workload from a database of a source DBMS for evaluation of cost of execution on an empty replica of the database in the target DBMS. Finally, the method can include predicting a temporal performance of the sample workload in the target DBMS as a product of the conversion factor and the cost of execution of the sample workload on the empty replica of the database in the target DBMS.

5 Claims, 2 Drawing Sheets

RELATIVE PERFORMANCE PREDICTION OF A REPLACEMENT DATABASE MANAGEMENT SYSTEM (DBMS)

CROSS-REFERENCE TO RELATED APPLICATIONS

This application is a Continuation of U.S. application Ser. No. 13/673,851, filed Nov. 9, 2012, currently pending, the entirety of which is incorporated herein by reference.

BACKGROUND OF THE INVENTION

1. Field of the Invention

The present invention relates to database migration in a database management system (DBMS) and more particularly to the evaluation of the performance of a database when migrating the database from one DBMS system to another.

2. Description of the Related Art

One of the most valuable assets that any organization has is the data that the organization accumulates as a result of its operations. Presently, an organization stores its data in a DBMS. A DBMS is a computer program (or in reality, a set of computer programs) that allows one or more computer users to create and access data in a database The DBMS manages user data requests and data requests from other computer programs so that users and other computer programs are free from having to understand where the data is physically located on storage media and, in a multi-user system, who else may also be accessing the data. Further, in handling user requests, the DBMS ensures the integrity of the data and the security of the data.

The choice of a particular DBMS is important. When an organization considers migrating an existing data warehouse from a existing DBMS to a different DBMS, a main consideration is the relative performance of the data warehouse after the migration. Indeed, this may be one of the key drivers behind the exchange of the existing DBMS to the new DBMS.

The databases managed by a DBMS typically are directed either to transaction processing or query and analysis. The latter type of database often is referred to as a data warehouse. Data warehouse systems are by definition extremely large and a full data migration of a data warehouse is usually a complex and time consuming process. The effort and duration required to perform the migration of the data warehouse in order to test the performance of a new replacement DBMS is generally well beyond the scope of the mere selection of the new DBMS. What is required is a facility to quantifiably predict the performance of a data warehouse system post-migration to the new DBMS, quickly and without actually migrating any data.

Efforts to compare the performance of rival DBMS systems have been made by others. Traditionally, these efforts involve populating a benchmark workload such as those provided by the Transaction Processing Performance Council, on each of the respective DBMS systems and comparing the performance of each. Naturally, this is a time-consuming activity and assumes that sufficient system resources including storage is available for each DBMS. Analogously, the current state-of-the-art provides techniques for preserving and validating query execution plans during the migration to another DBMS. Another contemporary performance evaluation method considers the prediction of the performance of a given DBMS under different workload and hardware configurations in order to provide for future capacity planning. However, the state of the art does not provide a solution for the accurate and quantifiable prediction of system performance on a replacement DBMS without migrating data, in order to make a reliable comparison with the existing DBMS before proceeding with its replacement.

BRIEF SUMMARY OF THE INVENTION

Embodiments of the present invention address deficiencies of the art in respect to DBMS migration and provide a novel and non-obvious method, system and computer program product for pre-migration performance prediction of a DBMS. In an embodiment of the invention, a method for pre-migration performance prediction of a DBMS can include executing a calibration workload in a target DBMS to produce a conversion factor of cost of executing the calibration workload to temporal performance of executing the calibration workload. The method also can include subsequently submitting a sample workload from a database of a source DBMS for evaluation of cost of execution on an empty replica of the database in the target DBMS. Finally, the method can include predicting a temporal performance of the sample workload in the target DBMS as a product of the conversion factor and the cost of execution of the sample workload on the empty replica of the database in the target DBMS.

In another embodiment of the invention, a database migration data processing system can be configured for pre-migration performance prediction of a target DBMS. The system can include source and target servers communicatively coupled to one another over a computer communications network, the servers individually comprising memory and at least one processor. The system also can include a source DBMS executing in the source server, and a target DBMS executing in the target server and a subject database managed by the source DBMS. Finally, the system can include a predictive performance module coupled to each of the source DBMS and target DBMS. The module can include program code enabled to execute a calibration workload in the target DBMS to produce a conversion factor of cost of executing the calibration workload to temporal performance of executing the calibration workload, to subsequently submit a sample workload from the database of the source DBMS for evaluation of cost of execution on an empty replica of the database in the target DBMS and to predict a temporal performance of the sample workload in the target DBMS as a product of the conversion factor and the cost of execution of the sample workload on the empty replica of the database in the target DBMS.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being

DETAILED DESCRIPTION OF THE INVENTION

Embodiments of the invention provide for pre-migration performance prediction of a DBMS. In accordance with an embodiment of the invention, a calibration workload can be provided to a query optimizer of a target DBMS in order to produce optimizer cost on performance of the target DBMS. Additionally, the calibration workload can be executed against the target DBMS and a resulting temporal performance of the execution of the workload in the target DBMS measured. Thereafter a cost to temporal conversion factor of the target DBMS can be calculated as the quotient of the optimizer statistics and the measured resulting temporal performance.

Concurrently, a replica empty database of a source DBMS can be created in the target DBMS and a mapping of the query optimizer statistics of the source DBMS to the target DBMS can be applied to the target DBMS. Finally, sample workload captured from the source DBMS over a period of time can be provided to the query optimizer to produce a new estimated cost on the performance of the target DBMS and the cost to conversion factor previously computed for the target DBMS can be applied to the new optimizer costs as a product to predict the temporal performance of the target DBMS in respect to the sample workload. The predicted temporal performance of the target DBMS then can be compared to the known temporal performance of the source DBMS in order to evaluate the desirability of migrating from the source DBMS to the target DBMS.

Figure 1:
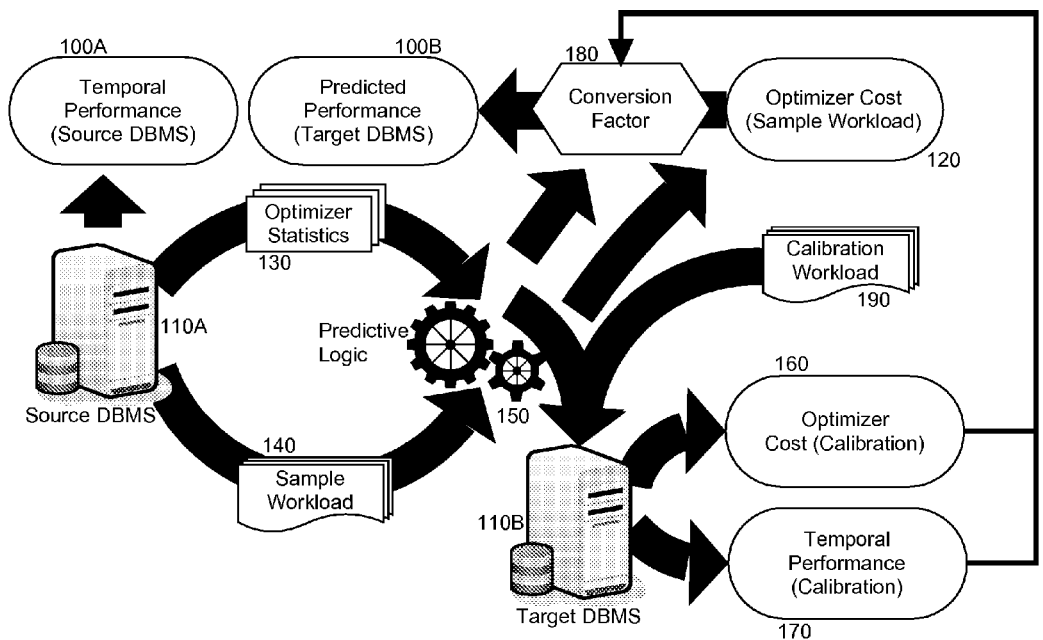
FIG. 1 is a pictorial illustration of a process for pre-migration performance prediction of a DBMS.

In further illustration, FIG. 1 pictorially shows a process for pre-migration performance prediction of a DBMS for a selected database in a source DBMS 110A to be migrated to a target DBMS 110B. As shown in FIG. 1, a calibration workload 190 can be provided to a target DBMS 110B in order to produce an optimizer cost 160 of processing the calibration workload in the target DBMS 110B. The calibration workload 190 also can be executed in the target DBMS 110B in order to measure the temporal performance 170 of the target DBMS 110B in executing the calibration workload 190. Thereafter, a conversion factor 180 can be computed as the quotient of the optimizer cost 160 and the temporal performance 170.

Once the conversion factor 180 of the target DBMS 110B has been computed, optimizer statistics 130 of a source DBMS 110A can be mapped to the target DBMS 110B and a sample workload 140 can be acquired from the source DBMS 110A, for instance a sequence of query statements exercising data in the source DBMS 110A as measured over a fixed period of time. In this regard, the optimizer statistics 130 can be stored in a database catalog of the source DBMS 110A and can be mapped from a source database catalog of the source DBMS 110A to a target database catalog of the target DBMS 110B. Additionally, a replica of the database of the source DBMS 110A can be created in the target DBMS 110B. Predictive logic 150 can submit the sample workload 140 to a query optimizer in the target DBMS 110B for the replica in order to retrieve an optimizer cost 120 of the sample workload.

Thereafter, the predictive logic 150 can apply the conversion factor 180 to the optimizer cost 120 of the sample workload in order to generate a predicted performance 100B of the database in the target DBMS which then can be compared to a known temporal performance 100A of the database in the source DBMS 110A. The predicted performance 100B, in turn, can be presented visually to an end user in comparison to the known temporal performance 100A of the database in the source DBMS 110A.

Figure 2:
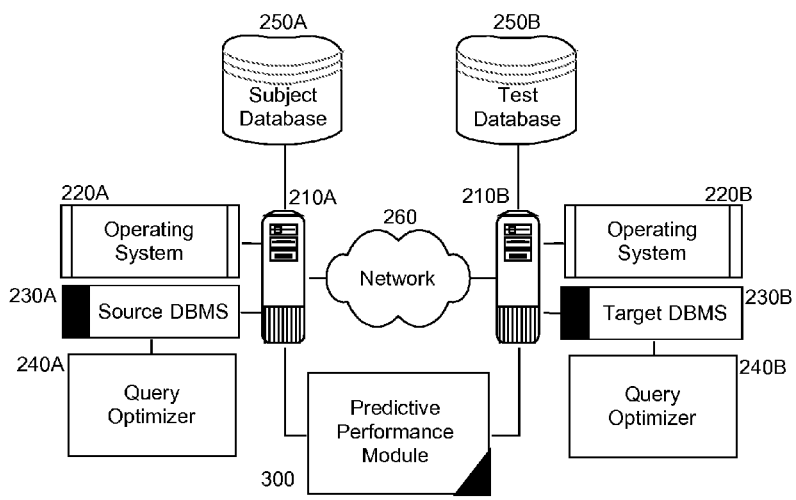
FIG. 2 is a schematic illustration of a database migration data processing system configured for pre-migration performance prediction of a target DBMS; and, FIG. 3 is a flow chart illustrating a process for pre-migration performance prediction of a DBMS.

The process described in connection with FIG. 1 can be implemented within a DBMS. In yet further illustration, FIG. 2 schematically shows a database migration data processing system configured for pre-migration performance prediction of a target DBMS. The system can include a source server 210A and a target server 210B, each with memory and at least one processor, coupled to one another over a computer communications network 260. Further, an operating system 220A in the source server 210A can host the execution of a source DBMS 230A, and an operating system 220B in the target server 210B can host the execution of a target DBMS 230B. Finally, the source DBMS 230A can manage access to a subject database 250A to be migrated to the target DBMS 230B.

A predictive performance module 300 can be coupled to each of the source DBMS 230A and the target DBMS 230B. The predictive performance module 300 can include program code that when executed in the memory of a computer can be enabled to apply a calibration workload of database operations to the target DBMS 230B in order to generate a measured temporal performance of the duration of time required to complete the calibration workload. An exemplary calibration workload can include the workload specified by the TPC-H benchmark. The program code of the module 300 additionally can be enabled to invoke a query optimizer 240B in the target DBMS 240B with the calibration workload so as to produce a query execution plan indicating a cost of executing the directives of the calibration workload. Thereafter, the program code of the module 300 can be enabled to compute a conversion factor as the quotient of the measured temporal performance and the produced cost.

The program code of the module 300 even yet further can be configured to create an empty replica of the subject database 250A as a test database 250B in the target DBMS 230B, to map query optimization fields of the source DBMS 230A to the target DBMS 230B as set forth in a query optimizer 240A of the source DBMS 230A. As such, the program code of the module 300 can be enabled to submit a sample workload from the source DBMS 230A to the query optimizer 240B of the target DBMS 230B in order to produce a query execution plan indicating a cost of executing the directives of the sample workload. Finally, the program code of the module 300 can be enabled to predict the temporal performance of the target DBMS 230B in executing the directives of the sample workload as the product of the conversion factor and the cost of executing the directives of the sample workload.

Figure 3:
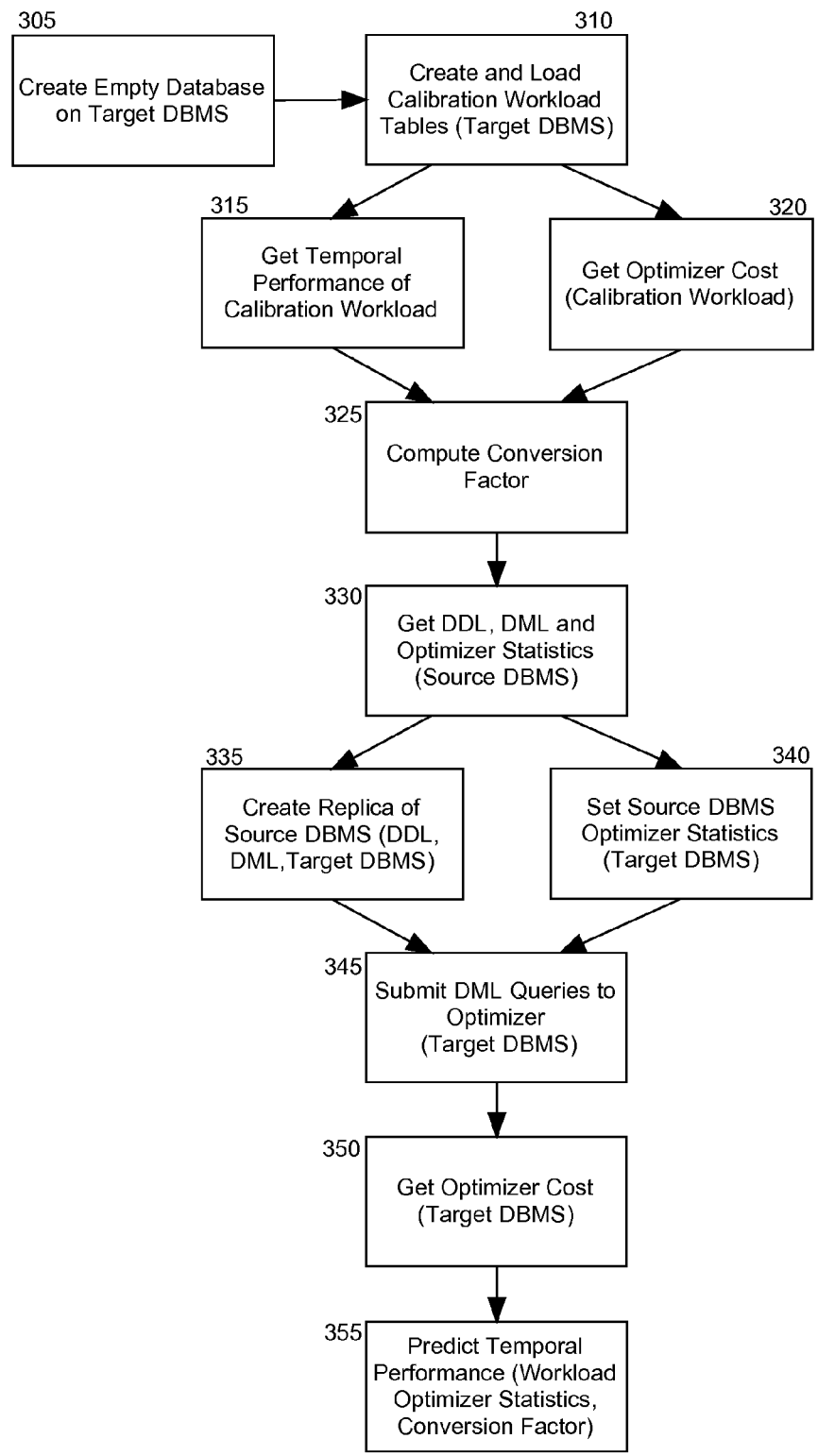

In even yet further illustration of the operation of the module 300, FIG. 3 is a flow chart illustrating a process for pre-migration performance prediction of a DBMS. Beginning in block 305, an empty replica of the database can be created in a target DBMS. In block 310, a calibration workload can be created, for instance by reference to a Transaction Processing Performance Council (TPC)-H workload and in block 315 the temporal performance of executing the directives of the calibration workload can be measured. Concurrently, in block 320 a query optimizer cost can be retrieved for the calibration workload in order to produce a cost for the calibration workload. Thereafter, in block 325 a conversion factor can be computed as the quotient of the cost and the measured temporal performance.

In block 330, the data definition language (DDL), a set of data manipulation language (DML) queries and also query optimization statistics of the query optimizer of the source DBMS can be retrieved. In this regard, the DML queries can be acquired as a sample workload of a duration of time of the source DBMS, for instance through an automatic workload repository or system monitor statement snapshots. In block 335, a replica of the database in the source DBMS can be created in the empty database of the target DBMS using the DDL. Additionally, in block 340 the retrieved query optimization statistics can be created in the target DBMS.

In block 345, the DML queries can be submitted to the target DBMS for processing by the query optimizer. Subsequently, in block 350, the query optimizer of the target DBMS can produce a query optimization plan indicating a cost of executing the DML queries. Finally, in block 355 a temporal performance of the DML queries can be predicted as the product of the cost of executing the DML queries by the conversion factor. The predicted performance then can be compared to a known temporal performance of the DML queries in the source DBMS in order to objectively evaluate a relative performance difference between the source DBMS and target DBMS before migrating the subject database from the source DBMS to the target DBMS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for pre-migration performance prediction of a database management system (DBMS), the method comprising:

executing a calibration workload in a target DBMS to produce a conversion factor of cost of executing the calibration workload to temporal performance of executing the calibration workload;

subsequently submitting a sample workload from a database of a source DBMS for evaluation of cost of execution on an empty replica of the database in the target DBMS; and, predicting a temporal performance of the sample workload in the target DBMS as a product of the conversion factor and the cost of execution of the sample workload on the empty replica of the database in the target DBMS.

2. The method of claim 1, wherein the calibration workload is an ad-hoc, decision support benchmark derived workload.

3. The method of claim 1, wherein the sample workload is a selection of database queries captured over a duration of time in the source DBMS.

4. The method of claim 1, wherein the cost of executing the calibration workload is determined from a query execution plan produced by submitting the calibration workload to a query optimizer of the target DBMS, and the cost of executing the sample workload is determined from a query execution plan produced by establishing optimization statistics from a query optimizer of the source DBMS in the query optimizer of the target DBMS and submitting the sample workload to the query optimizer of the target DBMS.

5. The method of claim 1, wherein the empty replica of the database is produced from a set of dynamic data language (DDL) statements extracted from the database of the source DBMS.

* * * * *